United States Patent

Carroll et al.

[11] Patent Number: 5,986,219
[45] Date of Patent: Nov. 16, 1999

[54] METHOD OF INVENTORYING LIQUOR

[75] Inventors: Nicholas C. Carroll; John J. Roets, both of Lawrence, Kans.

[73] Assignee: Bar Beverage Control, Inc., Lawrence, Kans.

[21] Appl. No.: 09/006,901

[22] Filed: Jan. 14, 1998

[51] Int. Cl.[6] .............................. G01G 9/00; G01G 19/40; G06F 17/60
[52] U.S. Cl. ..................... 177/1; 177/25.15; 177/25.19; 705/28; 235/385
[58] Field of Search .................................. 177/1, 2, 3, 4, 177/5, 15, 25.13, 25.15, 25.19; 705/28, 29; 235/385

[56] References Cited

U.S. PATENT DOCUMENTS

| | | | |
|---|---|---|---|
| 2,279,375 | 4/1942 | Manning | 177/1 |
| 2,936,163 | 5/1960 | Foster | 177/1 |
| 3,836,755 | 9/1974 | Ehrat | 177/1 |
| 3,863,724 | 2/1975 | Dalia, Jr. | 177/1 |
| 4,141,442 | 2/1979 | Cole et al. | 198/429 |
| 4,373,133 | 2/1983 | Clyne et al. | 235/383 |
| 4,419,734 | 12/1983 | Wolfson et al. | 177/25.15 |
| 4,420,051 | 12/1983 | Furuta et al. | 177/25.18 |
| 4,521,677 | 6/1985 | Sarwin | 235/385 |
| 4,563,739 | 1/1986 | Gerpheide et al. | 177/25.19 |
| 4,632,254 | 12/1986 | Scopatz | 209/592 |
| 4,779,706 | 10/1988 | Mergenthaler | 186/61 |
| 4,787,467 | 11/1988 | Johnson | 177/50 |
| 4,879,650 | 11/1989 | Kurimoto et al. | 177/25.15 |
| 4,891,755 | 1/1990 | Asher | 705/28 |
| 4,961,533 | 10/1990 | Teller et al. | 177/25.19 |
| 4,997,012 | 3/1991 | Kuziw | 141/83 |
| 5,055,660 | 10/1991 | Bertagna et al. | 235/472 |
| 5,057,677 | 10/1991 | Bertagna et al. | 235/381 |
| 5,493,107 | 2/1996 | Gupta et al. | 235/385 |
| 5,566,066 | 10/1996 | Weitzman et al. | 705/29 |
| 5,774,865 | 6/1998 | Glynn | 177/25.19 |

*Primary Examiner*—Randy W. Gibson
*Attorney, Agent, or Firm*—Hovey, Williams, Timmons & Collins

[57] ABSTRACT

A liquor inventorying method for determining the amount of liquor dispensed during a shift in a restaurant or bar and therefore discouraging theft or overpouring of the liquor is disclosed. The method is implemented with the aid of a weigh scale and a computer program and includes the steps of separating all of the liquor bottles in the bar or restaurant into a plurality of categories based on similar characteristics between the liquor bottles such as liquor costs; determining an approximate average cost of liquor per unit weight in each category; weighing all of the bottles in a category in groups after a shift to determine how much liquor was dispensed from the category; determining the approximate cost of liquor dispensed from all of the liquor bottles within the category, and comparing the approximate total cost of liquor dispensed from the category to the amount of revenue received.

11 Claims, 6 Drawing Sheets

CHANGE BOTTLE

Location: 1 front bar
Category: 1 well

| Liquor | Shelf | Size | Type | Full | Empty | Price |
|---|---|---|---|---|---|---|
| Montezuma | 1 | L | Teq | 3.32 | 1.19 | 6.66 |
| Bartons Gin | 2 | L | Bour | 3.73 | 1.68 | 7.78 |
| Castillo | 3 | L | Cana | 3.73 | 1.68 | 6.12 |
| Early Times | 4 | L | Bour | 3.73 | 1.68 | 7.78 |
| Iverhouse | 5 | L | Scot | 3.75 | 1.03 | 8.54 |
| Viaka | 6 | L | Vod | 3.03 | 1.44 | 5.31 |
| Dry Vermouth | 7 | L | Verm | 3.19 | 1.15 | 3.80 |
| Sw.Vermouth | 8 | L | Verm | 3.03 | 1.44 | 3.80 |
| Tripple Sect. | 9 | L | Cord | 3.19 | 1.15 | 5.31 |

Liquor  Shelf  Size  Type  Full  Empty  Price

[ Delete ]  [ Close ]  [ Charge ]

TAX RATE

| Date | Tax Rate | Comment |
|---|---|---|
| 9-1-97 | .10 | liquor tax |

Rate Information

Date [ 11-11-97 ]   Tax Rate [     ] %

Comment [                    ]

[ Add New ]  [ Save ]  [ Close ]

FIG. 11.

```
INVENTORY FORM
┌─ Inventory Info ──────────────────────────────────┐
│ FRIDAY   128   [Date]  [11-7-97] 🔲   [Shift:] [Shift 1 ▼] │
│ [Comment] [                                     ] │
└────────────────────────────────────────────────────┘
                                              ─132
┌─ Selected Location ────────────────────────────────┐
│ [Bartender] [Nick Carroll ▼]   [Location:] [1 front bar ▼] │
│              130           138 [Category:] [1 well ▼]  ─134
└────────────────────────────────────────────────────┘
┌─ Available Liquors At This Location ─┐ [Empty] [0 ⇅]
│ Liquor Name   | Empty | NBS         │ ┌──────────────┐
│ Jack Daniels  |   2   | False       │ │ NBS=FALSE    │
│ Jim Beam      |   0   | False       │ 140─[Weight #1] 35.68
│ Jim Beam Rye  |   0   | False       │ 142─[Weight #2] 29.67
│ Makers Mark   |   0   | False       │ 144─[Weight #3] 34.42
│ Seagrams 7    |   0   | False       │ 146─[Weight #4]
│ Gilbey's      |   0   | False       │ 148─[Total Weight] 99.77
│ Ameretto      |   0   | False       │
│ S. Comfort    |   0   | False       │ [  Update Category  ]
│ Bacardi Lt.   |   0   | False       │
└─────────────────────────────────────┘ [Close Inventory for this shift]
  136                                    150              152
```

FIG. 12.

```
REVENUE
┌─ Inventory Information ───────────────────────┐
│ [Date] [11-7-97]   [Shift:] [Shift 1]         │
└───────────────────────────────────────────────┘
                                          154
┌─ Revenue Detail ──────────────────────┐  [Revenue]
│ Location    | Category  | Revenue     │  [$] [.00]
│ 1 front bar | 1well     |     .00     │
│ 1 front bar | 2call     |     .00     │
│ 1 front bar | 3premium  |             │
│                                        │
│                                        │       156
│                                        │     [Close]
└────────────────────────────────────────┘
```

INVENTORY CONTROL FORM

Date 5-27-97

TUESDAY

| | a | b | c | d | e | f2 | g | h | i | j | k | l | m |
|---|---|---|---|---|---|---|---|---|---|---|---|---|---|
| | AVE. $ PER OUNCE | WEIGHT TOTAL | OUNCE TOTAL | TOTAL $ PER OUNCE | DAILY REVENUE | DAILY REVENUE WITH TAX | EST. DRINKS SOLD | EST. DRINKS PAID FOR | DIFF. | RETAIL PRICE / DRINK | ACTUAL LIQUOR % GOAL 27% | RESPONSIBLE BARTENDER NUMBER | RESPONSIBLE BARTENDER NAME |
| Ft. bar well | $0.22 | 13.47 | 215.52 | $47.41 | $171.25 | $155.68 | 172 | 137 | 35 | $1.25 | 30.45% | 014 | Matt |
| Ft. bar call | $0.34 | 1.5 | 24 | $8.16 | $25.00 | $22.73 | 19 | 10 | 9 | $2.50 | 35.90% | 011 | Ann |
| Ft. bar pre | $0.64 | 1.34 | 21.44 | $13.72 | $25.00 | $22.73 | 17 | 8 | 9 | $3.00 | 60.37% | | |
| | | | total | $69.29 | total | $201.14 | | | | total | 34.45% | | |
| Bk. bar well | $0.22 | 6.38 | 102.08 | $22.46 | $136.00 | $123.64 | 82 | 109 | -27 | $1.25 | 18.17% | 003 | Jason |
| Bk. bar call | $0.34 | 1.19 | 19.04 | $6.47 | $38.50 | $35.00 | 15 | 15 | -0 | $2.50 | 18.49% | | |
| Bk. bar pre | $0.64 | 1.74 | 27.84 | $17.82 | $55.50 | $50.45 | 22 | 19 | 4 | $3.00 | 35.32% | | |
| | | | total | $46.75 | total | $209.09 | | | | total | 22.36% | | |
| | | | grand total | $116.04 | grand total | $410.23 | | | | grand total | 28.29% | | |

*FIG. 14.*

METHOD OF INVENTORYING LIQUOR

BACKGROUND OF THE INVENTION

1. Field of the Invention

The present invention relates to a method for inventorying liquor. More particularly, the invention relates to a method of quickly and accurately determining the amount of liquor dispensed from a plurality of liquor bottles in a bar or restaurant during a shift or other time period by first separating the liquor bottles into categories based on cost or other criteria, weighing the liquor bottles in groups to determine the amount of liquor dispensed from each category of liquor, and then comparing the amount of liquor dispensed to the amount of revenue received for the liquor to determine the amount of liquor that was stolen, overpoured, or otherwise improperly dispensed.

2. Description of the Prior Art

Many bars, restaurants, and other liquor-serving establishments lose great sums of money due to liquor theft and/or accidental or intentional overpouring by bartenders and other employees. To discourage theft and overpouring, the owners or managers of many establishments attempt to monitor their employees while they dispense liquor. Unfortunately, liquor theft and overpouring are difficult to detect on an on-going basis because of the speed at which bartenders pour liquor, especially when busy.

Another way to discourage liquor theft and overpouring is to inventory liquor both before and after each shift to determine the amount of liquor dispensed (or stolen) during a shift and to then compare the amount of dispensed (or stolen) liquor to the amount of revenue received for sales of the liquor. Unfortunately, inventorying liquor is also difficult and time-consuming. For example, one prior art method of inventorying liquor involves individually weighing each liquor bottle in the establishment before and after a shift, then multiplying the weight of the liquor dispensed from each bottle by the cost of the liquor per unit weight of the bottle to obtain the total cost of liquor dispensed or stolen from each bottle. After all the bottles are weighed, the total cost of liquor dispensed from all the bottles is added and compared to the total revenue received for liquor sales to determine how much of the liquor was improperly dispensed or stolen.

Unfortunately, because most bars and restaurants have many different types of liquor all having different costs, these types of prior art liquor weighing systems require that each liquor bottle be individually weighed at the end of every shift and then placed back in its proper location behind the bar, an extremely time-consuming and inconvenient procedure, especially for large establishments. Thus, many bar owners or managers that use these prior art methods are reluctant to consistently inventory liquor after each shift, and instead frequently skip several shifts between inventory sessions. However, if inventories are not taken regularly, the owner or manager cannot accurately pinpoint which bartender or other employee stole or overpoured liquor when the liquor is finally inventoried after several shifts.

OBJECTS AND SUMMARY OF THE INVENTION

In view of the foregoing, it is an object of the present invention to provide an improved method of inventorying liquor in a bar, restaurant, or other liquor-serving establishment.

It is a more particular object of the present invention to provide a liquor inventorying method that is more convenient and less time-consuming than prior art methods.

In view of these objects and other objects that become evident from the description of the preferred embodiments of the invention herein, an improved liquor inventorying method for a bar, restaurant or other liquor-serving establishment is disclosed. The method is preferably implemented with the aid of a weigh scale and a programmed computer and requires that all of the liquor bottles in the establishment first be separated into a plurality of categories according to some criteria such as the cost of the liquor in the bottles so that each category includes bottles having similar liquor costs. The approximate average cost of liquor per unit weight for all of the liquor bottles in each category is then determined.

All of the bottles in each category are then weighed in groups, at least several bottles at a time, after a shift to determine the amount of liquor that was dispensed from the category during the shift. The amount of liquor dispensed is then multiplied by the average cost of liquor for that category to determine the approximate cost of liquor dispensed from the category. These steps are then repeated for all of the categories. Finally, the approximate costs of liquor dispensed from all the categories are added and compared to the amount of revenue received for the dispensed liquor to determine the amount of liquor that was stolen, overpoured or otherwise improperly dispensed.

The method of the present invention provides numerous advantages over prior art liquor inventorying and weighing methods. For example, by first separating the liquor bottles into categories of bottles according to their costs or other criteria and then weighing the bottles in groups, the present method is significantly faster than prior art methods and therefore decreases the amount of time required to inventory all of the liquor bottles in a bar or restaurant. This will encourage bar owners and managers to more consistently inventory liquor to more effectively discourage bartenders and other employees from stealing liquor and/or accidentally or intentionally overpouring liquor.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

The liquor inventory method of the present invention allows an owner, manager, or other user to accurately and quickly take the inventory of a bar, restaurant or other liquor-serving establishment containing a plurality of different liquor bottles. As described in detail below, the method permits the user to quickly determine the amount of liquor dispensed from all of the liquor bottles even though many of the liquor bottles contain different types of liquors having different costs.

Figure 1:
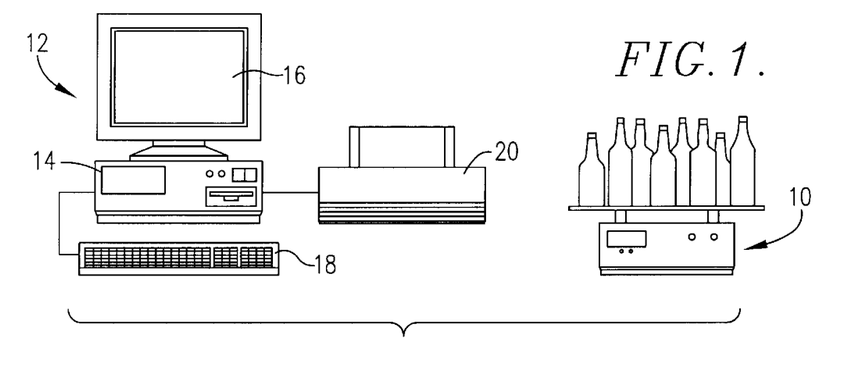
FIG. 1 is a schematic diagram of a computer and a weigh scale used to implement certain steps of the present invention.

As illustrated in FIG. 1, the liquor inventorying method is preferably implemented with a weigh scale 10 and a programmed computer 12. The weigh scale may be any commercially available scale such as the Model No. PS scale manufactured by the Mettler-Toledo Company. The computer 12 is preferably an IBM compatible personal computer and includes a CPU 14, a monitor 16, a keyboard 18, and a printer 20. The computer is programmed to perform the steps described below. The program is preferably written in Visual Basics 5.0 but may be written in any other suitable computer language as a matter of design choice.

A liquor inventorying session in accordance with the present invention involves two parts: (1) computer set up to customize the method and computer program for a particular bar or restaurant; and (2) inventorying of the bar or restaurant. Each of these parts is described separately below.

COMPUTER SET UP

Figure 2:
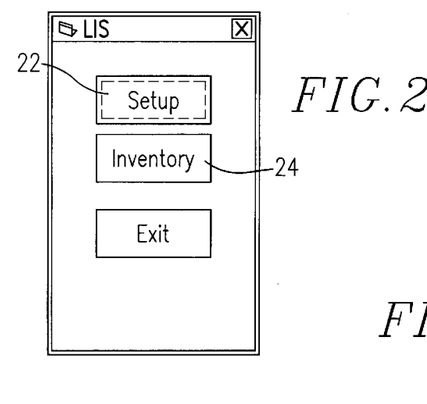
FIG. 2 is a screen display of the main menu of the computer program that is displayed before beginning a liquor inventorying session.

Once the computer program has been loaded on the computer 12 and the computer has been initialized, a screen similar to the one illustrated in FIG. 2 is initially displayed. To begin set up of the computer to customize the present method for a particular establishment, the user first clicks on the "Setup" icon 22 which displays a screen similar to the one illustrated in FIG. 3. The menu in the FIG. 3 screen includes icons 26,28,30,32,34,36 that allow the user to select a user password, select a bartender password, set up a database of all the liquor bottles in the bar or restaurant including the location and category of the bottles, add a bottle to the database, change a bottle in the database, and set the sales tax rate for the liquor sold, respectively. Each of these functions is described below.

User Password

Figure 3:
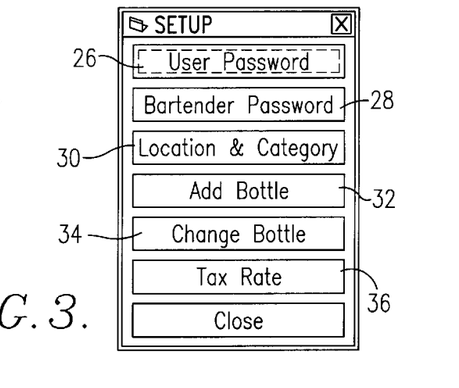
FIG. 3 is a screen display listing the options for setting up the computer.

The "User Password" function allows the user to select a unique user password that allows only him or her to access the computer program. This is done by clicking on the "User Password" icon 26 and selecting a numeric or alphanumeric password or code in a conventional manner.

Bartender Password

Figure 4:
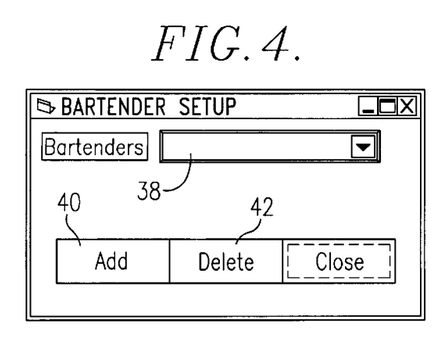
FIG. 4 is a screen display of the of the bartender setup portion of the program.

The "Bartender Password" function of the computer program allows the user to set up the names and passwords for all of the bartenders that work in the restaurant or bar and that are to be monitored with the liquor inventorying method of the present invention. This function is implemented by clicking on the "Bartender Password" icon 28, which displays a screen similar to the one illustrated in FIG. 4. To add a bartender to the list, the user merely directs the cursor or pointer to the "Bartenders" box 38, types in the name of the bartender, and clicks on the "Add" icon 40. These steps are then repeated for every bartender to be monitored. To delete a bartender, the user merely scrolls down the list of bartenders in the "Bartender" box, highlights the name of a particular bartender, and then clicks on the "Delete" icon 42.

Liquor Database

The "Location and Category" function of the computer program allows the user to set up a database of all the liquor bottles in the bar or restaurant. Within this database, the user then selects and identifies names for the various bar stations or locations in the establishment and separates all of the liquor bottles in each bar location into various categories according to similarities between the bottles such as the cost of the liquor in the bottles.

Figure 5:
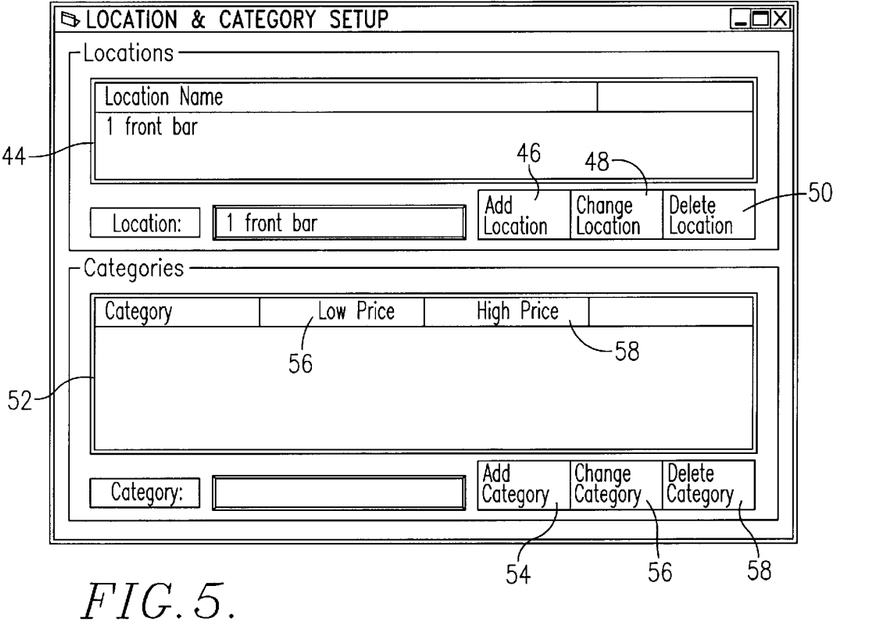
FIG. 5 is a screen display of the location and category setup portion of the program.

To begin this function, the user clicks on the "Location & Category" icon and a screen similar to the one illustrated in FIG. 5 is displayed. The user then identifies the various bar locations within the establishment by typing the bar location names in the "Location" box 44 one at a time and then clicking on the "Add Location" icon 46 after each entry. Typical bar location names may be "Front Bar", "Back Bar", "East Bar", "West Bar", etc. The program of course allows the user to pick any name for the bar locations. The bar location names may be modified or deleted by highlighting the appropriate location in the "Location" box and then clicking on the "Change Location" icon 48 or the "Delete Location" icon 50.

Once the bar locations have been set up, the user then creates a plurality of separate categories for all of the liquor bottles in each bar location. The liquor bottles in each bar location will later be separated into these categories based on similarities between the bottles. For example, the bottles may be separated according to price or type so that bottles with similar liquor costs are within the same category. Typical categories may include "Well", "Call", "Premium", "Super Premium", "Wine", "Kitchen Liquors", etc; however, any category names may be selected as long as bottles within each category have similar characteristics such as similar liquor costs.

To enter the categories for each bar location, the user first highlights the bar location in the "Location" box 44 in FIG. 5. The user then types in the name of the first category in the "Categories" box 52 and clicks on the "Add Category" icon 54. At this point, the "Low Price" and "High Price" columns 56,58 in the "Categories" box will both have the number "0.00" inserted therein. This is because no liquor bottles have yet been added to the category so the liquor prices for the category are still unknown. Once the liquor bottles are added to the categories as described below, liquor prices will be added to these columns.

The categories may be changed or deleted by highlighting the appropriate category and then clicking on the "Change Category" icon 56 or the "Delete Category" icon 58. After all of the bar locations and categories within the bar locations have been set up, the user merely closes the FIG. 5 screen display.

Add Bottle

The "Add Bottle" function of the computer program allows the user to designate which liquor bottles will be placed in each category. Before beginning, the user should have a list of all of the types of liquors in the establishment as well as the bottle sizes and the prices for the liquors. To facilitate this portion of the computer set up, the computer program may include a database containing the names, bottle sizes, and full and empty weight values of many popular liquors so that this information does not need to be retyped by the user.

Figure 6:
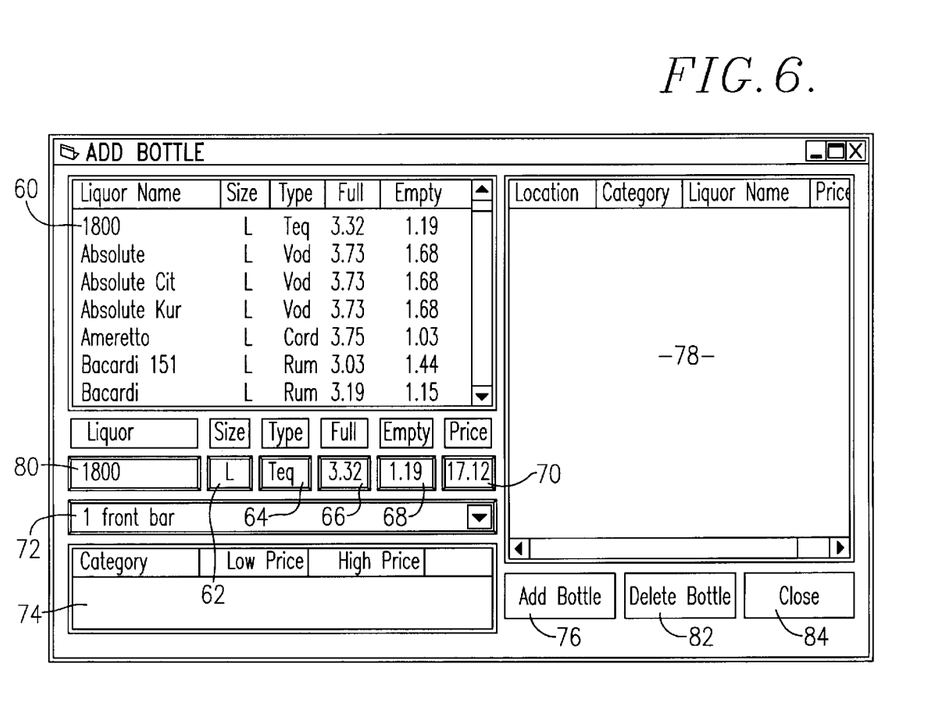
FIG. 6 is a screen display of the bottle adding portion of the program.

To add a bottle to a category, the user first clicks on the "Add Bottle" icon 32 illustrated in FIG. 3 which displays a screen similar to the one illustrated in FIG. 6. The user may then scroll down the database of existing liquors shown in the upper left field 60 of the screen until the user finds the desired liquor type. As mentioned above, the database already includes the size, type, and full and empty weight values for the liquors, which are displayed in boxes 62,64, 66,68. However, the database does not include a price for the liquor, which must be entered in the box 70.

Once a liquor bottle has been selected, the user identifies the desired bar location in which this bottle should be placed from the list of bar locations in the box 72. The user must then identify the category in which to place the bottle by clicking on the "Category" box 74 and selecting from one of the categories designated for that bar location. Finally, the user clicks on the "Add Bottle" icon 76 to place the liquor bottle in the "Master List" field 78 on the right side of the screen.

The "Add Bottle" function of the computer program also allows the user to add to a category liquor bottles that are not contained in the database by scrolling down the database field 60 and clicking on "Custom Bottle" (not shown). The box 80 will then display "Custom Bottle", but the values in boxes 62,64,66,68,70 will be blank. The user then merely deletes the "Custom Bottle" name and adds the correct name for the added liquor bottle and types in the appropriate information in the boxes 62–70. Finally, the user clicks on the "Add Bottle" icon 76 to add the custom bottle to the database. This procedure may be repeated for as many custom bottles as desired.

The above steps are repeated for each liquor bottle that is to be added to each category in the first bar location. The steps are then re-repeated for every bar location in the establishment. Liquor bottles may be deleted from a category by performing similar steps and clicking on the "Delete Bottle" icon 82. Once all of the liquor bottles have been added to their appropriate bar locations and categories, the user clicks on the "Close" 84 icon to return to the main set up menu.

Change Bottle

The "Change Bottle" function of the computer program allows the user to identify the proper shelf location or order for all of the liquor bottles. While not required to implement the method of the present invention, placing the bottles in a known and consistent shelf order helps the user to inventory the bar more quickly and accurately. Once the liquor bottles are placed in their proper locations, bartenders and other employees should be instructed to pour from only one bottle at a time so that the liquor bottles can be returned to the open shelf space to maintain the shelf order of the bottles.

Figure 7:
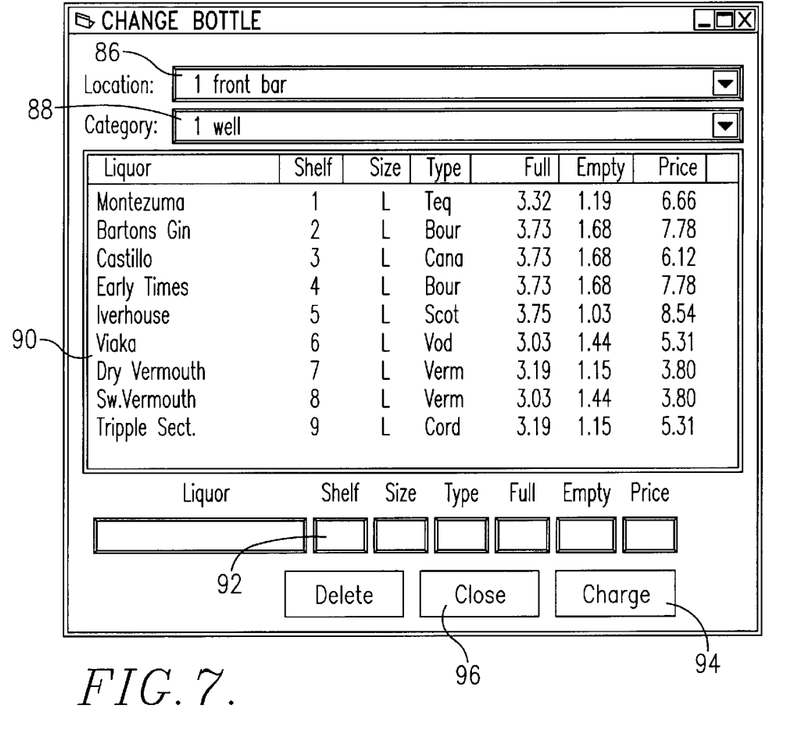
FIG. 7 is a screen display of the bottle changing portion of the program.

To enter the shelf order, the user first clicks on the "Change Bottle" icon 34 in FIG. 3, which displays a screen similar to the one illustrated in FIG. 7. The user should then highlight the desired bar location in the "Location" box 86 and the first category within the bar location in the "Category" box 88. This will display all the liquor bottles that were placed in the selected category of the selected bar location in the field 90. At this time, the liquor bottles will be listed in the order in which they were added during the "Add Bottle" function of the program.

To change the bottles' shelf order, the user first highlights one of the listed liquor bottles, selects the proper shelf order for the liquor bottle in the "Shelf" column 92, and clicks on the "Change" icon 94. These steps are repeated until the shelf order is established for all of the bottles in the list, for the first category, and then re-repeated for all of the categories of all the bar locations. When finished, the user clicks on the "Close" icon 96 to return to the main set up menu.

Tax Rate

Figure 8:
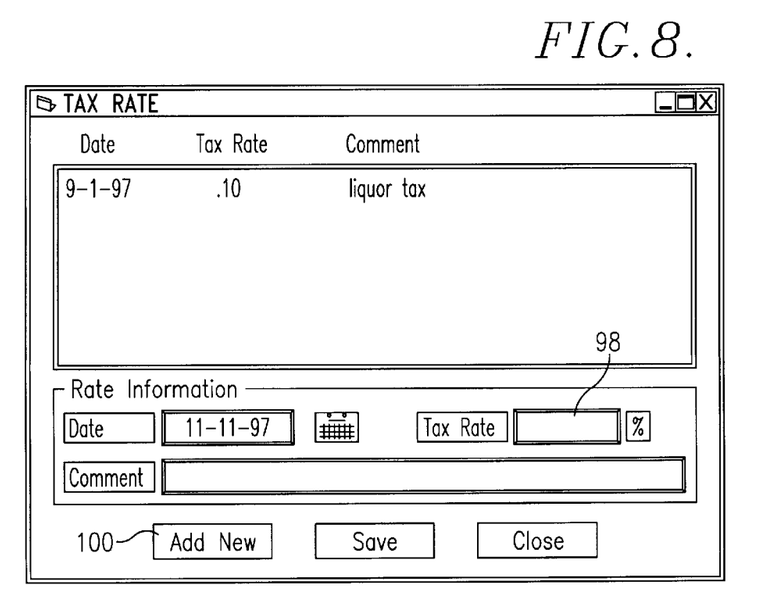
FIG. 8 is a screen display of the tax rate setting portion of the program.

The "Tax Rate" function of the computer program allows the user to identify the appropriate liquor sales tax for the establishment so that the inventory calculations described below are more accurate. To begin the "Tax Rate" function, the user first clicks on the "Tax Rate" icon 36 in FIG. 3, which displays a screen similar to the one illustrated in FIG. 8. The user then enters the appropriate tax rate in the box 98 and then clicks on the "Add New" icon 100. The tax rate may be changed by simply clicking the box 98, entering a new tax rate, and clicking on the "Add New" icon.

The computer program will now be set up and customized for the user's particular bar or restaurant. The user can adjust any of the data relating to the inventory, prices, shelf order, etc., by entering the appropriate portion of the program and making the changes as discussed above.

LIQUOR INVENTORYING

Once the computer program has been set up and initialized, the user may begin an actual liquor inventorying session. Liquor inventorying will typically be conducted by an owner or manager and should be conducted at regular intervals such as between shifts or at the close of business each day.

Figure 9:
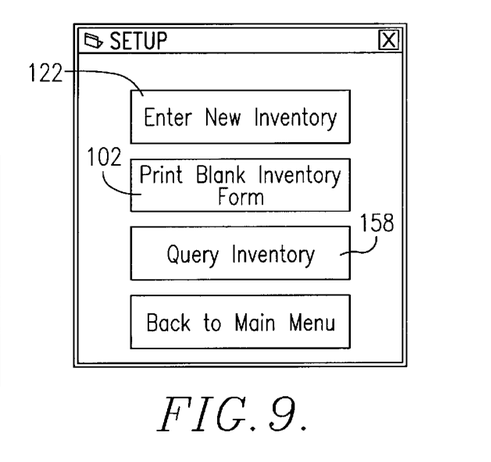
FIG. 9 is a screen display listing inventory options.
Figures 10, 13:
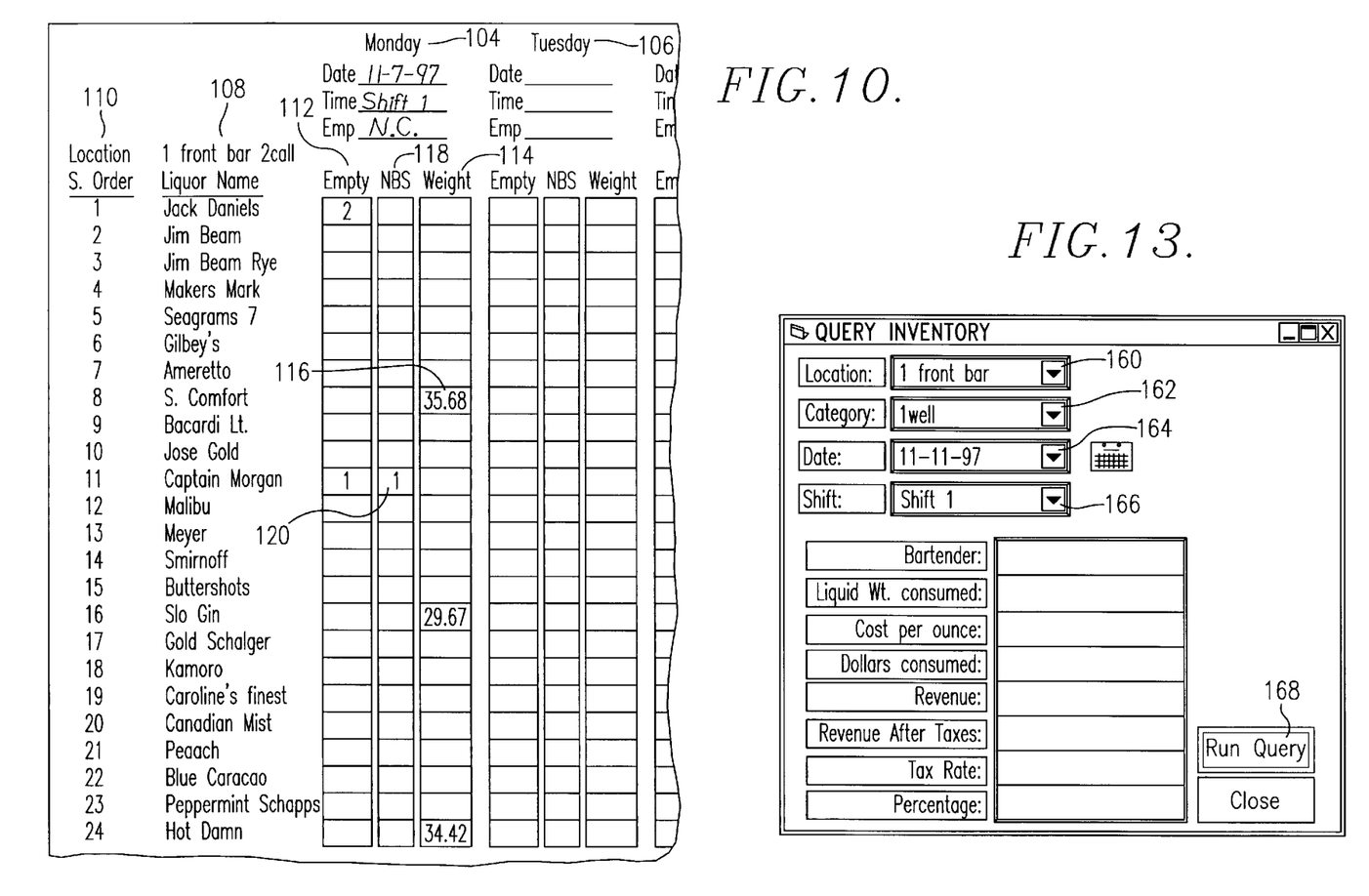
FIG. 10 is a fragmentary view of a liquor inventory form used during the inventorying of liquor.
FIG. 13 is a screen display for entering a query during an inventorying session.

The first step in conducting an inventory session is to print out a blank Inventory Form similar to the one illustrated in FIG. 10. This is done by first clicking on the "Inventory" icon 24 shown in FIG. 2, which will then display a screen similar to the one illustrated in FIG. 9. The user then clicks once on the "Print Blank Inventory Form" icon 102, which will display the Inventory Form on the computer monitor 16.

The Inventory Form displayed will always reflect the information that was entered during the setting up or customizing of the computer program for the particular bar or restaurant. Each time the set up information is changed, the Inventory Form will also change. Thus, it is important that the Inventory Form be reviewed to be sure that it is current. If the form is current, the user should print it by clicking on a "Print" icon (not shown).

As illustrated in FIG. 10, the printed Inventory Form has columns 104,106 for each day of the week (only two being shown) and blank lines under each day of the week for recording the date, the shift that the inventory is taken, and the initials or name of the person taking the inventory. The Inventory Form also has a column 108 that indicates the various bar locations and the categories in the bar locations. Following each category is a list of the liquor bottles in that category. For example, as illustrated in FIG. 10, the "1 front bar" bar location has the category "call" containing the liquor bottles: Jack Daniels, Jim Beam, Jim Beam Rye, etc. The form also has a column 110 listing the shelf order for each of these liquors. FIG. 10 illustrates only a portion of the Inventory Form—the full form lists the corresponding liquor bottles for every category or group of every bar location.

To begin the physical inventory, the user takes the Inventory Form to the first bar location and counts the empty bottles, weighs the bottles by category or group, checks the back stock, enters the information into the Inventory Form, and then transfers the information to the computer. Each of these steps is discussed in more detail in the following paragraphs.

Counting Empty Bottles

To accurately inventory a bar location, the bartenders or other employees must not throw away empty bottles during their shift. To this end, a crate, box, or other receptacle should be placed at or near each bar location and the bartenders should be told to place all empty bottles therein. The person taking inventory should look in the crate or box and mark the number of empty bottles of each liquor type in the "Empty" column 112 of the Inventory Form. For example, if the crate under the front bar contains two empty Jack Daniels bottles and one empty Captain Morgan bottle, the "Empty" column should be filled in as shown in FIG. 10. Once all of the empty bottles have been counted and entered into the Inventory Form, the empties may be thrown away.

Weighing The Bottles

The method of the present invention determines the amount of liquor that has been dispensed during a shift or other time period by comparing the weight of the bottles before and after the shift. As described in more detail below, the amount of liquor that was dispensed is then compared to the revenues received to accurately determine the amount of liquor stolen, overpoured, or otherwise improperly dispensed.

To significantly decrease the amount of time necessary to take inventory, the present method allows the liquor bottles to be weighed in groups. This is possible because as described above, the liquor bottles are separated into categories according to their cost so that all of the liquor bottles within a particular category have similar costs. The costs of all of the liquor within a particular category are averaged when determining the cost of the liquor dispensed as will be discussed below.

The liquor bottles are weighed in groups by placing two or more of the liquor bottles within a category, and preferably eight liquor bottles, on the weigh scale 10 at the same time as illustrated in FIG. 1. The weight of the first group of bottles is then entered in the "Weight" column 114 of the Inventory Form in the blank next to the last liquor bottle in the group. For example, as illustrated in FIG. 10, if the first eight listed liquor bottles weigh 35.68 pounds, this value is entered in the eighth blank 116 in the "Weight" column. These steps are repeated for all of the liquor bottles within the first category of the first bar location until all of the liquor bottles in the category have been weighed. Then, the entire weighing process is repeated again for each and every category of each and every bar location.

No Back Stock

The Inventory Form includes an "NBS" column 118 that stands for "No Back Stock". "No Back Stock" indicates that an empty bottle has not been replaced with a new bottle and the bar location is therefore out of that type of liquor. An entry is made in the appropriate line of the column whenever the user determines that the liquor has not been restocked. For example, if the user finds an empty Captain Morgan bottle in the empty crate and saw that no bottle had been placed on the shelf in its place, the user would place an entry in the eleventh line 120 of the "NBS" column as illustrated in FIG. 10.

After all the categories of liquors in all of the bar locations have been inventoried, the bottles in the back stock should be counted. This allows the bar owner or manager to detect when employees or others steal entire bottles of liquor. The number of bottles in the back stock plus the number of empty bottles should be the same after every shift.

It is important that the empty bottles be counted, the back stock bottles be verified, and the full or partially full bottles on the shelf be weighed for every bar location and for every category within that bar location. For a typical size bar, a complete inventory of each bar location should take only approximately ten minutes.

Entering The Inventory Data

Once a complete inventory has been taken for every bar location, the user is ready to enter the data into the computer. To this end, the user should take the completed Inventory Form illustrated in FIG. 10 to the computer and then click on the "Inventory" icon 24 illustrated in FIG. 2, which will display a screen similar to the one illustrated in FIG. 9. The user should then click on the "Enter New Inventory" icon 122, which will display a screen similar to the one illustrated in FIG. 11.

Figure 11:
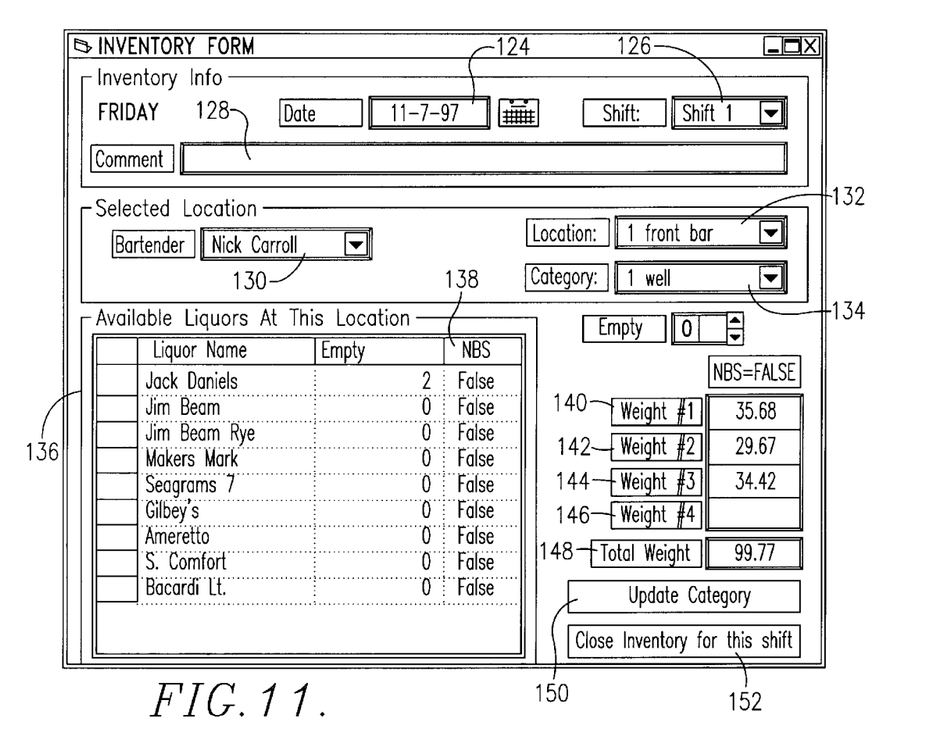
FIG. 11 is a screen display of an inventory form used during an inventorying session.

The screen will automatically display the present day and date in calendar ox 124. If the date for which the inventory data is being entered is different that the current date, the user should click on the calendar box and enter the correct date.

The user next chooses the shift for which the inventory data is being entered by selecting the proper shift in the "Shift" box 126. The user may also enter comments, such as that a bottle was accidentally broken or certain liquor discounts were given, in the "Comment" box 128. The user should then select the bartender responsible for the shift by scrolling down the "Bartender" box 130 and highlighting the name of the correct person.

At this point, the user should begin transferring data from the printed Inventory Form to the screen illustrated in FIG. 11. The user should first select the desired bar location in the "Location" box 132 and the desired category in the "Category" box 134. The user then enters the number of empty bottles and whether there were "No Back Stock Bottles" for each of the liquor bottles in the "Available Liquors At This Location" field 136 of the screen. An entry of "False" in the "NBS" column 138 means that back stock bottles are available, an entry of "True" means that no back stock exists.

The user should next enter the weight values for the selected bar location and category in the "Weight #1–4" boxes 140,142,144,146 of the screen. Using the example illustrated in FIG. 11 the user should enter "35.68" into the "Weight #1" box, "29.67" into the "Weight #2" box, and "34.42" into the "Weight #3" box. The program then adds these weight values and displays "99.97" in the "Total Weight" box 148.

Figure 12:
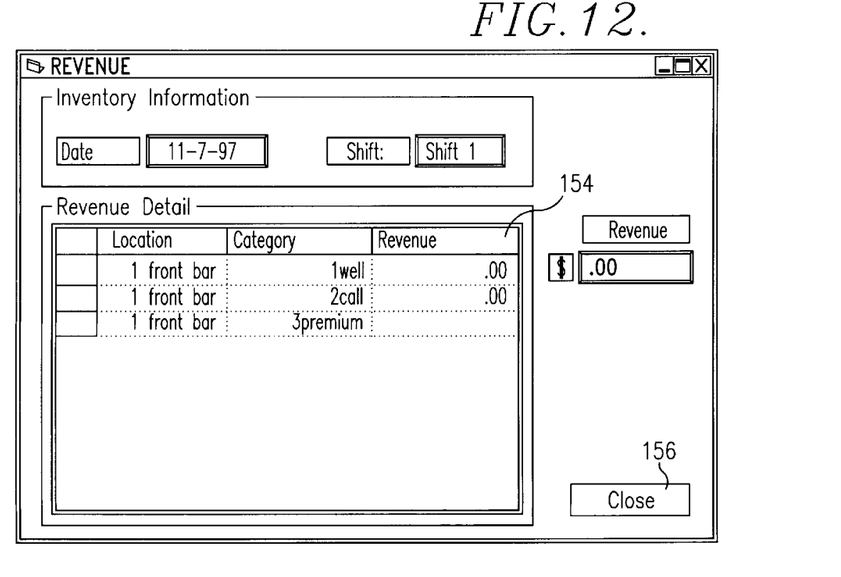
FIG. 12 is a screen display used to enter revenue information during an inventorying session.

Once all of the inventory data for a category within a bar location has been entered, the user should click on the "Update Category" icon 150, and the program will save this information and automatically pull up another Inventory Form for the next category of liquor in the same bar location. The above steps should be repeated for all of the categories within the bar location and then repeated again for all of the different bar locations until all of the data from the Inventory Form has been entered into the computer. The user should then click on the "Close Inventory For This Shift" icon 152, which will cause the program to prompt the user for revenue information by displaying a screen similar to the one illustrated in FIG. 12.

Entering Revenue Totals

Revenue received for liquor sales must be determined separately for each bar location and for each category of liquor within that bar location. Revenues can be determined in any conventional manner. The user should enter the separate revenue values into the corresponding boxes under the "Revenue" column 154 in FIG. 12. Once all the revenue values have been entered, the user clicks on the "Close" icon 156. The computer program will then make numerous calculations that enable the user to determine the exact amount of liquor dispensed and to compare this amount to the revenue received. These calculations are described below.

Query Inventory

After a complete inventory has been taken, the user may select any portion of the data to be displayed and/or printed in a final report. To do so, the user first clicks on the "Inventory" icon 24 in FIG. 2, which displays a screen similar to the one illustrated in FIG. 9. The user then clicks on the "Query Inventory" icon 158, which displays a screen similar to the one illustrated in FIG. 13. The user then selects the bar location, the category, the date, and the shift for which inventory information is desired in the boxes 160, 162, 164, 166, and then clicks on the "Run Query" icon 168. This displays the final Inventory Control Form illustrated in FIG. 14.

CALCULATIONS AND INTERPRETATION OF DATA

Figure 14:
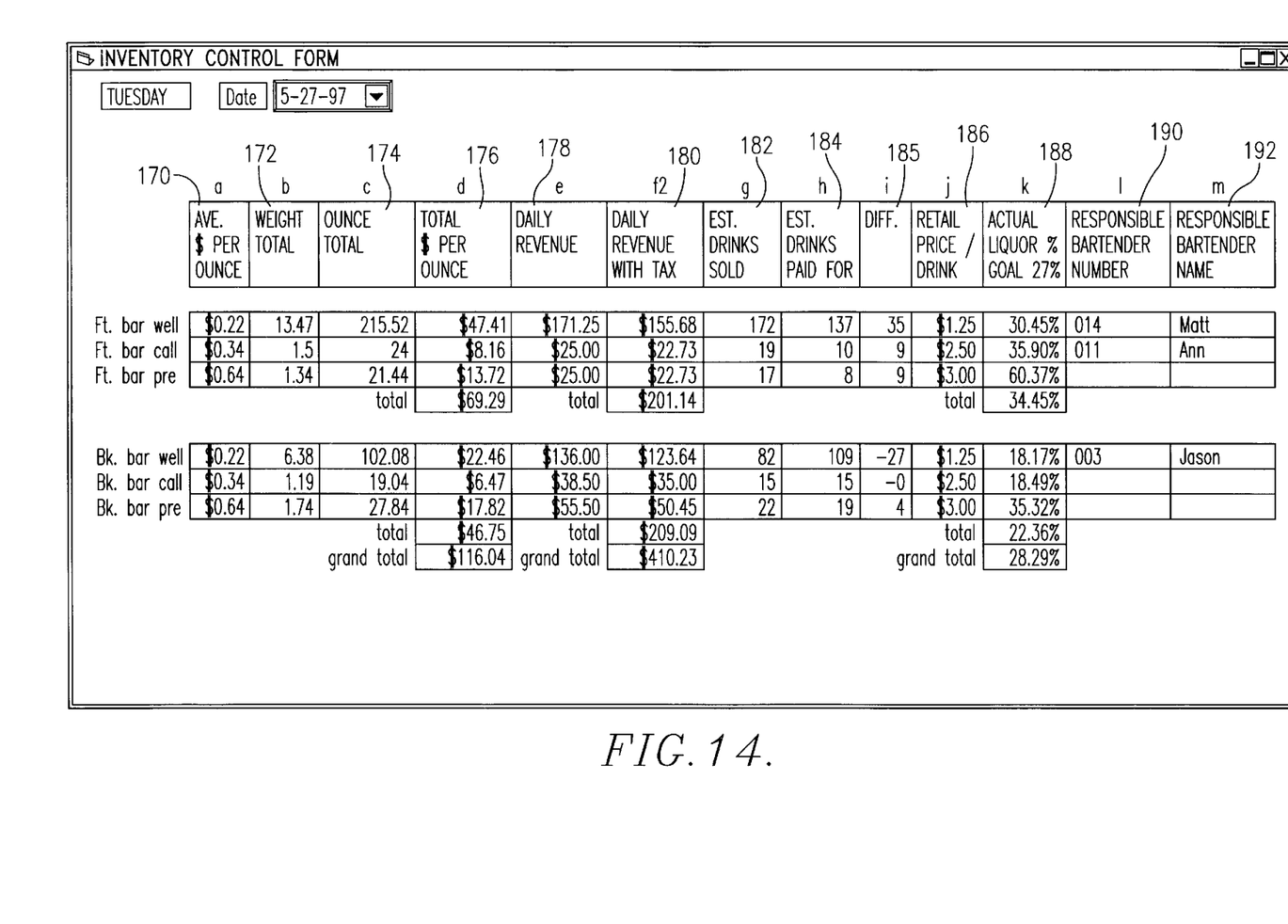
FIG. 14 is a screen display of an inventory control form that lists all the inventory data at the completion of an inventorying session.

The final Inventory Control Form includes, for each of the bar locations designated during the set up of the computer, the following columns: "AVE. $ Per Ounce" 170, "Weight Total" 172, "Ounce Total" 174, "Total $ Per Ounce" 176, "Daily Revenue" 178, "Daily Revenue With Tax" 180, "EST. Drinks Sold" 182 "EST. Drinks Paid For" 184, "Diff." 185, "Retail Price Per Drink" 186, "Actual Liquor % (Goal 27%)" 188, "Responsible Bartender Number" 190, and "Responsible Bartender Name" 192. The values in each of these columns, as well as the calculations made to arrive at the values, are described separately below.

AVE. $ Per Ounce

The "AVE. $ Per Ounce" column 170 displays the average cost per ounce for all of the liquors within a particular category of a particular bar location. For example, as indicated in the box 194, the average cost per ounce of the "Well" drink category in the front bar is $0.22. The average dollars per ounce is calculated by first calculating the average cost per ounce for each bottle within the category, adding the total dollars per ounce for all the liquor bottles in the category, and then dividing by the number of bottles within the category. The information needed to arrive at this value is stored in a database accessed by the computer program similar to the following:

the shift began, which was determined from the previous inventory session.

Ounce Total

The "Ounce Total" column 174 is merely a conversion of the "Weight Total" value from pounds to ounces.

Total $ Per Ounce

The "Total $ Per Ounce" column 176 lists the total cost of the alcohol that was dispensed from each of the categories for the selected bar locations during the shift. This number is determined by multiplying the values in the "Ounce Total" column 174 and the "Average Dollars Per Ounce" column 170.

Daily Revenue

The "Daily Revenue" column 178 lists the dollars received during the shift for the particular category of liquor in the particular bar location. As discussed above, this information was entered into the computer program directly from the Inventory Form.

Daily Revenue With Tax

The "Daily Revenue With Tax" column 180 lists the adjusted revenue after liquor taxes are taken into account. This value is determined by taking the number in the "Daily Revenue" column 178 and dividing it by one plus the liquor tax rate.

EST. Drinks Sold

The "EST. Drinks Sold" column 182 lists the estimated amounts of drinks that were sold during the shift. This value is calculated by assuming that each drink sold was 1.25 ounces and therefore multiplying the value in the "Ounce Total" column 174 times 1/1.25.

EST. Drinks Paid For

The "EST. Drinks Paid For" column 184 lists the approximate number of drinks that were paid for during the shift. This value is determined by dividing the value in the "Daily Revenue" column 178 by the retail drink price in column 186.

Diff.

The "Diff." column 185 lists the approximate number of drinks that are not accounted for by the sales. This value is determined by subtracting the number in the "EST. Drinks Paid For" column 184 from the number in the "EST. Drinks Sold" column 182.

DATA BASE 1

| Brand Name | Size | Type | Price | Full | Empty | Liquid wt. | Ounces | $ per ounce |
|---|---|---|---|---|---|---|---|---|
| FRONT BAR WELL RIGHT: | | | | | | | | |
| Barton's | L | GIN | $4.96 | 3.25 | 1.17 | 2.08 | 33.28 | $0.15 |
| Castillo | L | RUM | $6.12 | 3.25 | 1.13 | 2.12 | 33.92 | $0.18 |
| Dry Vermouth | L | VERMO | $3.80 | 2.81 | 1.13 | 1.68 | 26.88 | $0.14 |
| EarlyTime | L | BOURB | $7.78 | 3.24 | 1.15 | 2.09 | 33.44 | $0.23 |
| Inverhouse | L | SCOTCH | $8.54 | 3.22 | 1.14 | 2.08 | 33.28 | $0.26 |
| Montezuma | L | TEQUILA | $6.66 | 3.25 | 1.22 | 2.03 | 32.48 | $0.21 |
| Sw. Vermouth | L | VERMO | $3.80 | 2.83 | 1.13 | 1.70 | 27.2 | $0.14 |
| Triple Sect. | L | CORDIA | $5.31 | 3.63 | 1.31 | 2.32 | 37.12 | $0.14 |
| Viaka | L | VODKA | $5.70 | 2.22 | 0.12 | 2.10 | 33.6 | $0.17 |
| | | | | Total empty | 9.5 | total average per ounce | | $0.18 |

Weight Total

The "Weight Total" column 172 lists the amount of liquor in the category that was dispensed during the shift. As described above, this value is determined by weighing all of the bottles in the category after the shift, taking into account the empty bottles and the no back stock bottles, and then subtracting this value from the weight of the bottles before Retail Price Per Drink The "Retail Price Per Drink" column 186 lists the retail price for the drinks in the category.

Actual Liquor %

The "Actual Liquor %" column 188 lists a ratio or percentage of the cost of the liquor dispensed divided by the received revenue adjusted for tax. This value is determined by dividing the number in the "Total $ Per Ounce" column 176 by the number in the "Daily Revenue With Tax" column 180. For example, using the values listed in FIG. 14, the ratio of 30.45% is obtained by dividing $47.41 by $155.68.

The ratio in column 188 is the number that the bar owner or manager will use to gauge the effectiveness of the bartender and to determine if the bartender is overpouring, stealing, or otherwise improperly dispensing the liquor. The lower the ratio, the better, because a low value indicates that the bar received much more revenue for the liquor than the cost of the liquor. As set forth in the "Actual Liquor %" column, the computer program may also list a goal for the ratio, such as 27%.

Responsible Bartender Number

The "Responsible Bartender Number" column 190 merely lists the code or password for the responsible bartender for the shift for the particular bar location.

Responsible Bartender Name

The "Responsible Bartender Name" column 192 lists the bartenders name.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A liquor inventorying method for determining the amount of liquor dispensed from a plurality of liquor bottles, wherein at least some of the liquor bottles contain different types of liquors having different costs, the method comprising the steps of:
   a. separating the liquor bottles into a plurality of categories based on cost of the liquor in the bottles so that each category includes bottles having similar liquor costs;
   b. determining an amount of liquor dispensed from each category by comparing the amount of liquor contained in each category before dispensing liquor from the bottles to the amount of liquor contained in each category after dispensing liquor from the bottles;
   c. determining an amount of revenue received for the dispensed liquor; and
   d. comparing the amount of revenue received to the amount of liquor dispensed to determine an approximate amount of liquor that was not properly dispensed.

2. The liquor inventorying method as set forth in claim 1, further including the step of determining an approximate average cost of liquor per unit measure in each category.

3. The liquor inventorying method as set forth in claim 2, further including the step of determining an approximate cost of liquor dispensed from each category by multiplying the amount of liquor dispensed from each category times the approximate average cost of liquor per unit measure in each category.

4. The liquor inventorying method as set forth in claim 3, further including the step of adding the approximate cost of liquor dispensed from all the categories to determine an approximate total cost of liquor dispensed.

5. The liquor inventorying method as set forth in claim 4, wherein step "d" includes the step of comparing the amount of revenue received to the approximate total cost of liquor dispensed.

6. The liquor inventorying method as set forth in claim 5, wherein step "d" further includes the step of dividing the approximate total cost of liquor dispensed from all the categories by the amount of revenue received for the dispensed liquor to determine a liquor cost/liquor revenue ratio.

7. The liquor inventorying method as set forth in claim 6, wherein step "d" further includes the step of comparing the liquor cost/liquor revenue ratio to a target ratio to determine the performance of the person(s) dispensing the liquor from the bottles.

8. A liquor inventorying method for determining the amount of liquor dispensed from a plurality of liquor bottles, wherein at least some of the liquor bottles contain different types of liquors having different costs, the method comprising the steps of:
   a. separating the liquor bottles into a plurality of categories based on cost of the liquor in the bottles so that each category includes bottles having similar liquor costs;
   b. determining the approximate average cost of liquor per weight in each category;
   c. weighing the bottles in each category before dispensing liquor from the bottles to determine an original weight of liquor in each category;
   d. re-weighing the bottles in each category after dispensing liquor from the bottles to determine a new weight of liquor in each category;
   e. determining an amount of liquor dispensed from each category by subtracting the new weight from the original weight;
   f. determining an approximate cost of liquor dispensed from each category by multiplying the amount of liquor dispensed from each category times the approximate average cost of liquor per weight in each category;
   g. determining an amount of revenue received for each of the categories; and
   h. comparing the amount of revenue received for each category to the approximate cost of liquor dispensed from each category to determine an approximate amount of liquor that was not properly dispensed from each category.

9. The liquor inventorying method as set forth in claim 8, wherein step "h" includes the step of dividing the approximate cost of liquor dispensed from each category by the amount of revenue received for each category to determine a liquor cost/liquor revenue ratio.

10. The liquor inventorying method as set forth in claim 9, wherein step "h" further includes the step of comparing the liquor cost/liquor revenue ratio to a target ratio to determine the performance of the person(s) dispensing the liquor from the bottles.

11. The liquor inventorying method as set forth in claim 1, wherein each category includes several different types of liquors having different costs.

* * * * *